US012759100B2

(12) United States Patent
Hisada et al.

(10) Patent No.: US 12,759,100 B2
(45) Date of Patent: Oct. 13, 2026

(54) NITRIDED CUT TAP AND PRODUCTION METHOD THEREFOR

(71) Applicant: OSG CORPORATION, Toyokawa (JP)

(72) Inventors: Teruya Hisada, Toyokawa (JP); Takayuki Nakajima, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 600 days.

(21) Appl. No.: 18/270,828

(22) PCT Filed: Feb. 26, 2021

(86) PCT No.: PCT/JP2021/007553

§ 371 (c)(1),
(2) Date: Jul. 3, 2023

(87) PCT Pub. No.: WO2022/180845

PCT Pub. Date: Sep. 1, 2022

(65) Prior Publication Data

US 2024/0058906 A1 Feb. 22, 2024

(51) Int. Cl.
*B23P 15/52* (2006.01)
*B23G 5/06* (2006.01)

(52) U.S. Cl.
CPC ................ *B23P 15/52* (2013.01); *B23G 5/06* (2013.01)

(58) Field of Classification Search
CPC .................................. B23P 15/52; B23G 5/06
See application file for complete search history.

(56) References Cited

U.S. PATENT DOCUMENTS 6,220,797 B1 4/2001 Ishii et al.
8,465,828 B2 * 6/2013 Kanaoka ................ C23C 16/56 428/156

(Continued)

FOREIGN PATENT DOCUMENTS

CA 2404294 A1 * 10/2001 ........... C23C 30/005
CA 2627739 A1 * 9/2008 ................ B26F 1/14

(Continued)

OTHER PUBLICATIONS

Apr. 27, 2021 International Search Report issued in International Patent Application No. PCT/JP2021/007553.

(Continued)

*Primary Examiner* — Jermie E Cozart
(74) *Attorney, Agent, or Firm* — Oliff PLC

(57) ABSTRACT

A method of producing a nitrided cut tap that includes a nitrogen diffusion layer. The method includes (a) a nitriding step for forming the nitrogen diffusion layer in which nitrogen atoms contained in an atmospheric gas are diffused from a surface of a base material of the cut tap under heat, such that the nitrogen diffusion layer has a thickness ranging from 10 μm to 30 μm; and (b) a honing step for rounding a cutting edge portion by colliding abrasive particles against a local part of the cutting edge portion of the base material of the cut tap that has been subjected to the nitriding step, such that a difference between a thickness of the nitrogen diffusion layer in the cutting edge portion and a thickness of the nitrogen diffusion layer in flank and rake surfaces sandwiching the cutting edge portion, is not larger than 5 μm.

4 Claims, 7 Drawing Sheets

(56) References Cited

U.S. PATENT DOCUMENTS

| | | | | | |
|---|---|---|---|---|---|
| 2008/0095587 | A1* | 4/2008 | Henderer | B23P 15/52 | |
| | | | | 408/222 | |
| 2010/0260566 | A1* | 10/2010 | Glimpel | B23G 5/06 | |
| | | | | 408/222 | |
| 2012/0295519 | A1* | 11/2012 | Henderer | B23P 15/52 | |
| | | | | 451/48 | |
| 2019/0201993 | A1* | 7/2019 | Nakajima | B23G 5/06 | |

FOREIGN PATENT DOCUMENTS

| | | | | | |
|---|---|---|---|---|---|
| CN | 101284321 | A | | 10/2008 | |
| CZ | 61099 | A3 | * | 12/1999 | B23G 7/02 |
| EP | 1036618 | A2 | * | 9/2000 | B23B 27/145 |
| GB | 2338915 | A | * | 1/2000 | C23C 30/005 |
| JP | H09-038805 | A | | 2/1997 | |
| JP | 2000-005904 | A | | 1/2000 | |
| JP | 2004174698 | A | * | 6/2004 | B23G 5/06 |
| JP | 2005-082877 | A | | 3/2005 | |
| JP | 2008-272856 | A | | 11/2008 | |
| JP | 2009-066726 | A | | 4/2009 | |
| JP | 6583763 | B1 | * | 10/2019 | C23C 28/044 |
| JP | 2019171482 | A | * | 10/2019 | |
| JP | 2020-131310 | A | | 8/2020 | |
| WO | WO-2018070195 | A1 | * | 4/2018 | C23C 30/005 |
| WO | WO-2018158974 | A1 | * | 9/2018 | C23C 16/56 |

OTHER PUBLICATIONS

Apr. 27, 2021 Written Opinion issued in International Patent Application No. PCT/JP2021/007553.

Oct. 24, 2022 Office Action issued in Taiwanese Patent Application No. 111104604.

Feb. 21, 2023 Office Action issued in Taiwanese Patent Application No. 111104604.

Jun. 27, 2025 Office Action issued in Korean Patent Application No. 10-2023-7028454.

* cited by examiner

| | NUMBER OF MACHINING | | EVALUATION OF DURABILITY | |
|---|---|---|---|---|
| | 1ST ONE OF EACH SAMPLE | 2ND ONE OF EACH SAMPLE | 1ST ONE OF EACH SAMPLE | 2ND ONE OF EACH SAMPLE |
| SAMPLE 1 | 700 | 600 | LARGE WEAR | LARGE WEAR |
| SAMPLE 2 | 100 | 45 | CHIPPING | BREAKAGE |
| SAMPLE 3 | 400 | 400 | LARGE WEAR | LARGE WEAR |
| SAMPLE 4 | 900 | 900 | CONTINUABLE | CONTINUABLE |
| SAMPLE 5 | 900 | 900 | CONTINUABLE | CONTINUABLE |
| SAMPLE 6 | 130 | 100 | BREAKAGE | CHIPPING |

| | NUMBER OF MACHINING | | EVALUATION OF DURABILITY | |
|---|---|---|---|---|
| | 1ST ONE OF EACH SAMPLE | 2ND ONE OF EACH SAMPLE | 1ST ONE OF EACH SAMPLE | 2ND ONE OF EACH SAMPLE |
| SAMPLE 1 | 700 | 600 | LARGE WEAR | LARGE WEAR |
| SAMPLE 2 | 100 | 45 | CHIPPING | BREAKAGE |
| SAMPLE A | 203 | 100 | BREAKAGE | CHIPPING |
| SAMPLE B | 900 | 900 | CONTINUABLE | CONTINUABLE |
| SAMPLE C | 900 | 900 | CONTINUABLE | CONTINUABLE |
| SAMPLE D | 900 | 900 | LARGE WEAR | LARGE WEAR |
| SAMPLE E | 700 | 700 | LARGE WEAR | LARGE WEAR |

NITRIDED CUT TAP AND PRODUCTION METHOD THEREFOR

TECHNICAL FIELD

The present invention relates to a cut tap and a method of producing the cut tap, and particularly, to techniques for improving a service life of a nitrided cut tap.

BACKGROUND ART

For example, a cut tap (such as a straight flute tap, a spiral flute tap, a point flute tap, a pipe tap and a thread milling cutter) having cutting edges is desired to have a tool performance for maintaining a good cutting performance over a long period of time without wear or chipping on each cutting edge. The cut tap having such a tool performance makes it possible to increase a machining efficiency by reducing a number of times of tool change in a machine tool such as a machining center.

On the other hand, in Patent Document 1, a screw thread in a tapered leading portion is changed from an incomplete thread profile (in which its crest portion is cut) to a complete thread profile, in a direction away from a distal end of the tapered leading portion toward a complete thread portion, is divided in a circumferential direction by spiral or straight flute, and an end portion of each divided portion of the thread, i.e., one end face formed by the division, has a cutting edge defined along the spiral or straight flute. The Patent Document 1 proposes that the cutting edge is round-chamfered in order to suppress chipping (small breakage that occurs in the cutting edge) during cutting operation. However, the round-chamfered cutting edge lacks hardness and does not provide a sufficient durability for the cut tap.

On the other hand, in Patent Document 2, although it is not a cut tap, in order to suppress chipping and breakage of a tool (broach) having cutting edges, it is described that a white layer as a surface layer is removed by using a micro-blasting treatment to prevent peeling of a hard coating that is formed after the cutting edges have been subjected to a surface hardening treatment (gas nitriding) with a thickness d of about 50 μm that is larger than a height difference h between adjacent ones of the cutting edges which are adjacent to each other in a cutting direction.

PRIOR ART DOCUMENT

Patent Document

Patent Document 1: JP 2008-272856A
Patent Document 2: JP 2020-131310A

DISCLOSURE OF THE INVENTION

Object to be Achieved by the Invention

However, even if the micro-blasting treatment is applied onto an entire surface that has been hardened by the surface hardening treatment with gas nitriding, as described in the Patent Document 2, in a cut tap, chipping of each cutting edge easily occurs in the cut tap, so that it is not possible obtain a sufficient durability for the cut tap.

The present invention was made in view of the background discussed above. It is therefore an object of the present invention to provide a cut tap that is capable of providing a tool performance for maintaining a good cutting performance over a long period of time without wear or chipping on each cutting edge of the cut tap.

Measures for Solving the Problem

Having made various studies under the above-described situation, the present inventors and their colleagues focused on facts that the nitrogen diffusion layer was shown in black when a state of accelerated corrosion of the nitrogen diffusion layer was observed through a metallurgical microscope with an etchant being used on a cross section including the cutting edge of the cut tap, and that the nitrogen diffusion layer formed on a cutting edge portion, which received diffusion from a flank surface and a rake surface, was thicker than that formed on other surface layers. In general, the nitrogen diffusion layer has a property that a gradient of nitrogen concentration and hardness is higher in an inner portion than in a surface portion. Since the nitrogen concentration and the hardness in a tip portion of the cutting edge portion are higher than those in other portions, it is assumed that the tip portion of the cutting edge is brittle. Thus, the present inventors and their colleagues found that the cut tap exhibits a remarkably high durability service life, in a case in which the tip portion of the cutting edge is removed by a honing treatment after the surface hardening treatment with the gas nitriding, as compared with, for example, a case in which the surface hardening treatment is made with the gas nitriding after the honing treatment. The present invention was made based on this finding.

That is, the gist of a first invention is that, in a method of producing a nitrided cut tap that includes a nitrogen diffusion layer, the method comprises: a nitriding step for forming a nitrogen diffusion layer in which nitrogen atoms contained in an atmospheric gas are diffused from a surface of a base material of the cut tap under heat; and a honing step for rounding a cutting edge portion by colliding abrasive particles against the cutting edge portion of the base material of the cut tap that has been subjected to the nitriding step.

Further, the gist of a second invention is that, in a nitrided cut tap comprising a nitrogen diffusion layer, a difference between a thickness of the nitrogen diffusion layer in a cutting edge portion of the cut tap and a thickness of the nitrogen diffusion layer in another portion other than the cutting edge portion, is not larger than 5 μm.

Effects of the Invention

The method of producing the nitrided cut tap according to the first invention includes the nitriding step for forming the nitrogen diffusion layer in which the nitrogen atoms contained in the atmospheric gas are diffused from the surface of the base material of the cut tap under heat; and the honing step for rounding the cutting edge portion by colliding the abrasive particles against the cutting edge portion of the base material of the cut tap that has been subjected to the nitriding step. In the cutting edge portion, the nitrogen diffusion layer is formed to be thick due to the diffusion from the flank surface and the diffusion from the rake surface, so that a tip portion of the cutting edge portion has relatively high nitrogen concentration and hardness so as to be mechanically brittle. Therefore, with removal of the tip portion that is mechanically brittle, it is possible to reduce wear and chipping of the cutting edge portion of the cut tap and to obtain a tool performance for maintaining a good cutting performance over a long period of time. Further, a thickness of the nitrogen diffusion layer can be made uniform.

In the cut tap including the nitrogen diffusion layer according to the second invention, the difference between the thickness of the nitrogen diffusion layer in the cutting edge portion of the cut tap and the thickness of the nitrogen diffusion layer in another portion other than the cutting edge portion, is not larger than 5 μm. Therefore, the nitrogen concentration and the hardness are not so high in the cutting edge portion, and there is no large difference between the cutting edge portion and the other portion in terms of the mechanical brittleness, so that the wear and chipping of the cutting edge portion of the cut tap are reduced whereby the tool performance for maintaining a good cutting performance over a long period of time can be obtained.

It is preferable that, at the nitriding step, a nitriding treatment is applied to the base material of the cut tap in an atmosphere furnace that maintains a temperature ranging from 500° C. to 550° C. under an ammonia gas atmosphere.

It is preferable that, at the honing step, the abrasive particles are collided against a local part of the cutting edge portion with use of compressed air, whereby the tip portion of the cutting edge portion is removed.

It is preferable that, at the honing step, the tip portion of the cutting edge portion is removed such that the thickness of the nitrogen diffusion layer in the cutting edge portion is made smaller than that before removal of the tip portion and is approximated to the thickness of the nitrogen diffusion layer formed on a surface of the other portion other than the cutting edge portion.

It is preferable that, after the tip portion of the cutting edge portion has been removed at the honing step, the thickness of the nitrogen diffusion layer formed on the surface of the cut tap is not smaller than 10 μm and not larger than 30 μm, and a surface hardness of the cut tap is not smaller than 950 HV and not larger than 1050 HV.

It is preferable that an angle defined between a flank surface and a rake surface of the cutting edge portion is an acute angle.

MODES FOR CARRYING OUT THE INVENTION

There will be described an embodiment of the present invention in details with reference to drawings. It is noted that figures of the drawings are simplified or deformed as needed, and each portion is not necessarily precisely depicted in terms of dimension ratio, shape, angle, etc, for easier understanding of the embodiments.

Embodiment

Figure 1:
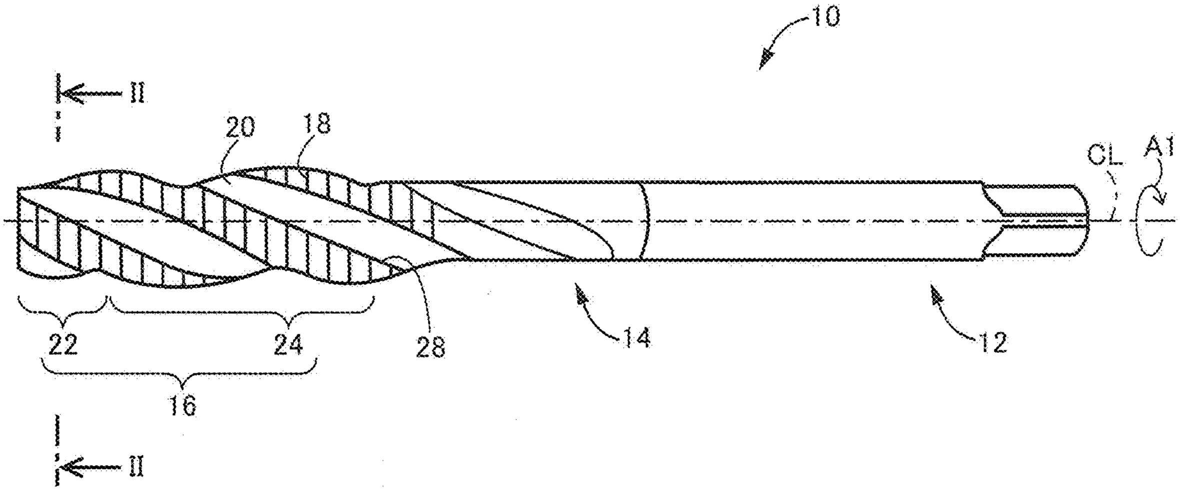
FIG. 1 is a view showing a three-flute spiral tap to which the present invention is applied.
Figure 2:
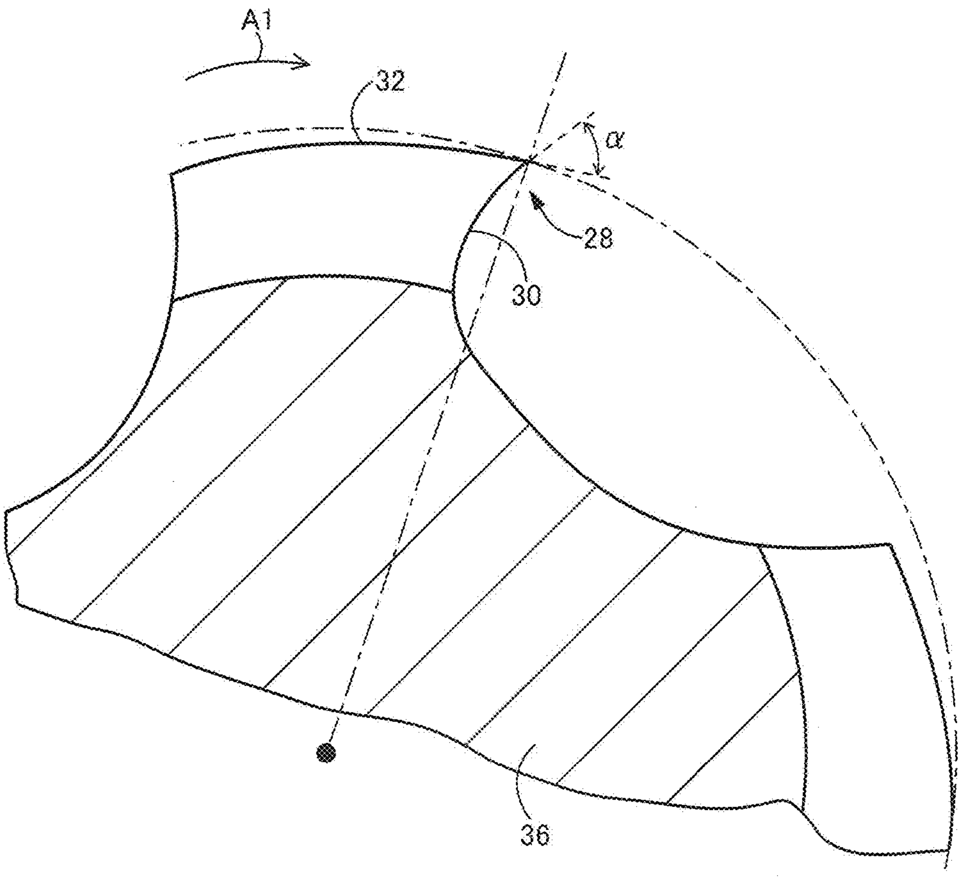
FIG. 2 is a II-II cross-sectional view of a leading portion of the spiral tap of FIG. 1, taken in a plane perpendicular to a rotation axis.

FIG. 1 is a view showing a three-flute spiral tap 10 to which the present invention is applied. FIG. 2 shows a cross section of a leading portion 22 of the spiral tap 10 of FIG. 1, and is a cross-sectional view taken along line II-II in FIG. 1. The spiral tap 10, which is an example of a cut tap, includes a shank portion 12, a neck portion 14 and a thread portion 16 which are integrally provided and arranged on a rotation axis CL in this order of description. The thread portion 16 is provided with an external thread corresponding to an internal thread that is to be machined, and three spiral flutes 20 that are arranged around the rotation axis CL with a constant interval, such that the external thread is divided by the spiral flutes 20 into divided portions.

The thread portion 16 includes the above-described leading portion 22 and a complete thread portion 24. In the leading portion 22 that is provided in an axially distal end portion of the thread portion 16, a screw thread 18 as the external thread is partially removed such that the leading portion 22 is tapered in an axial direction of the spiral tap 10. In the complete thread portion 24 that is provided to be contiguous to the leading portion 22, the screw thread 18 has a complete thread profile. A cutting edge portion 28 is defined by a ridgeline as an intersection of each of the three spiral flutes 20 with the above-described divided portions into which the external thread is divided by the spiral flutes 20, namely, is defined by one of widthwise opposite edges of each of the three spiral flutes 20 that is located on a rear side of the other of the widthwise opposite edges in a rotational direction A1. In the present embodiment, each of the spiral flutes 20, which is a right-hand helix flute, passes through the thread portion 16 and extends through almost full length of the neck portion 14. As shown in FIG. 2, the cutting edge portion 28 provided in the leading portion 22 is constituted by a distal end portion of a region sandwiched between a rake surface 30 having a recessed arcuate shape and a flank surface 32 having a protruding arcuate shape. An edge angle α of the cutting edge portion 28 is an acute angle.

Figure 3:
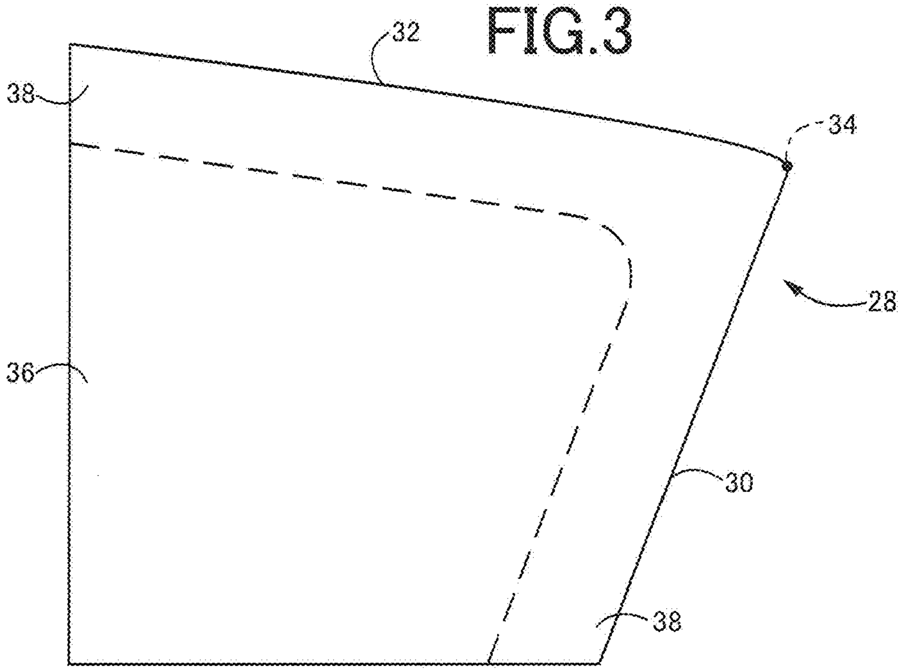
FIG. 3 is a view showing, in enlargement, a cutting edge portion of the spiral tap of FIG. 1 before the cutting edge portion is subjected to a honing treatment.
Figure 4:
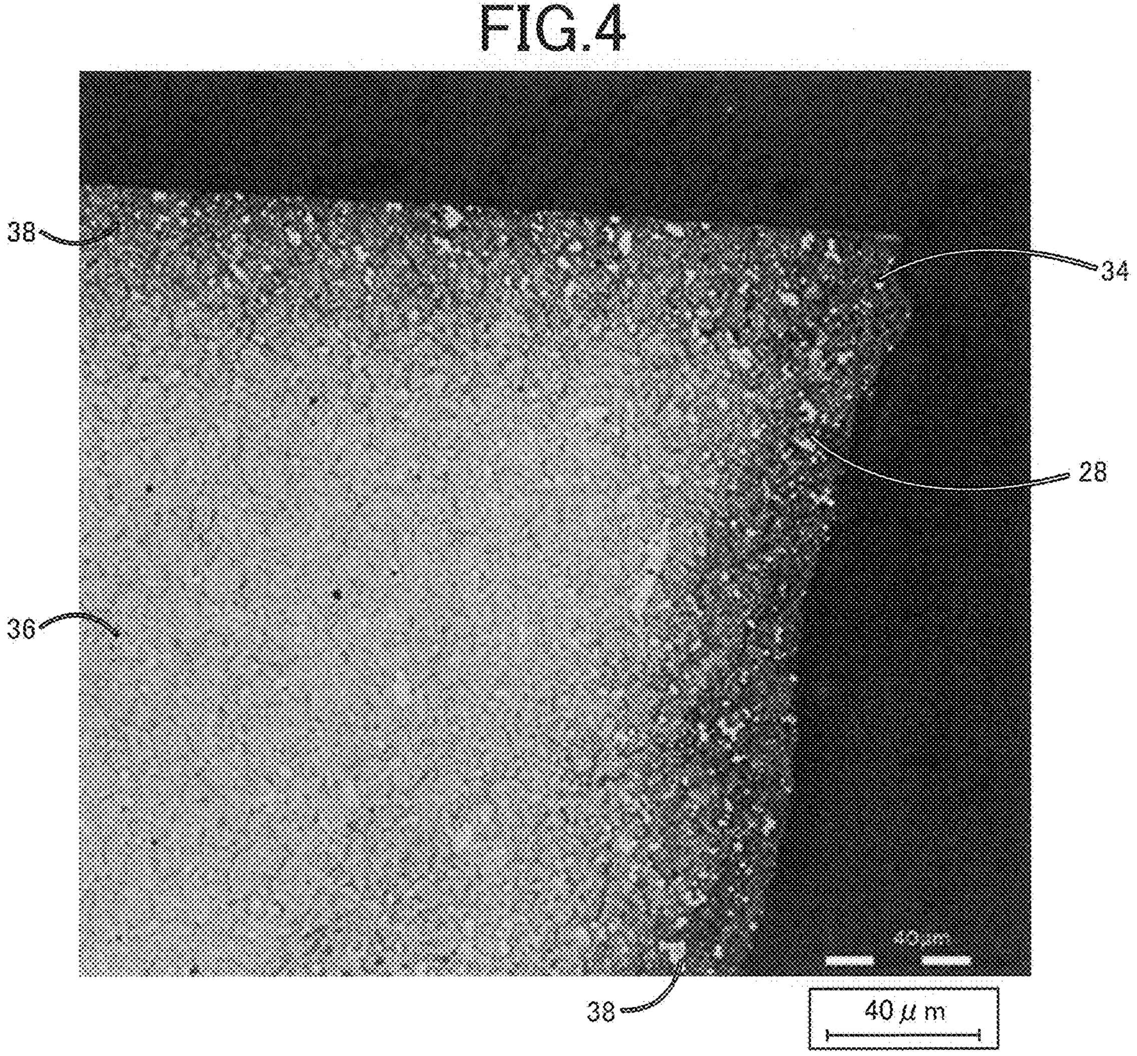
FIG. 4 is a metallurgical microscope photograph showing, in enlargement, the cutting edge portion of the spiral tap of FIG. 1 before the cutting edge portion is subjected to the honing treatment.
Figure 5:
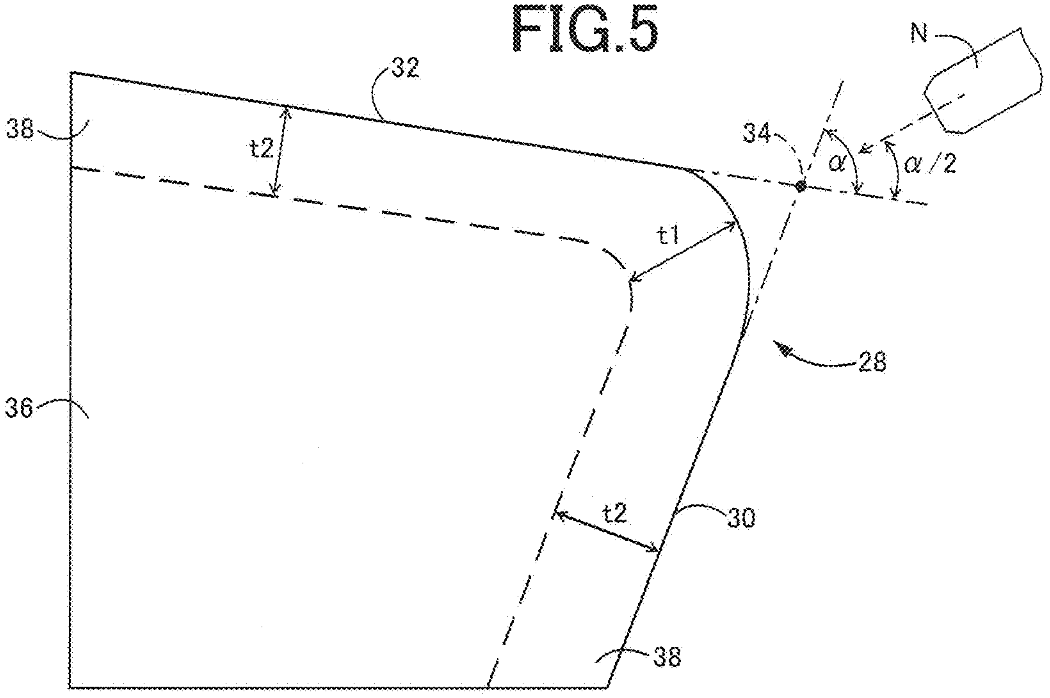
FIG. 5 is view showing, in enlargement, the cutting edge portion of the spiral tap of FIG. 1 after the cutting edge portion has been subjected to the honing treatment.

FIG. 3 is a view showing, in enlargement, the cutting edge portion 28 of the spiral tap 10 after a nitriding treatment (executed at a nitriding step P2 described below) and before a honing treatment (executed at a honing step P3 described below). FIG. 4 is a photograph showing, in enlargement, the cutting edge portion 28 after the nitriding treatment and before the honing treatment. FIG. 5 is view showing, in enlargement, the cutting edge portion 28 of the spiral tap 10 after the nitriding treatment and after the honing treatment.

Figure 6:
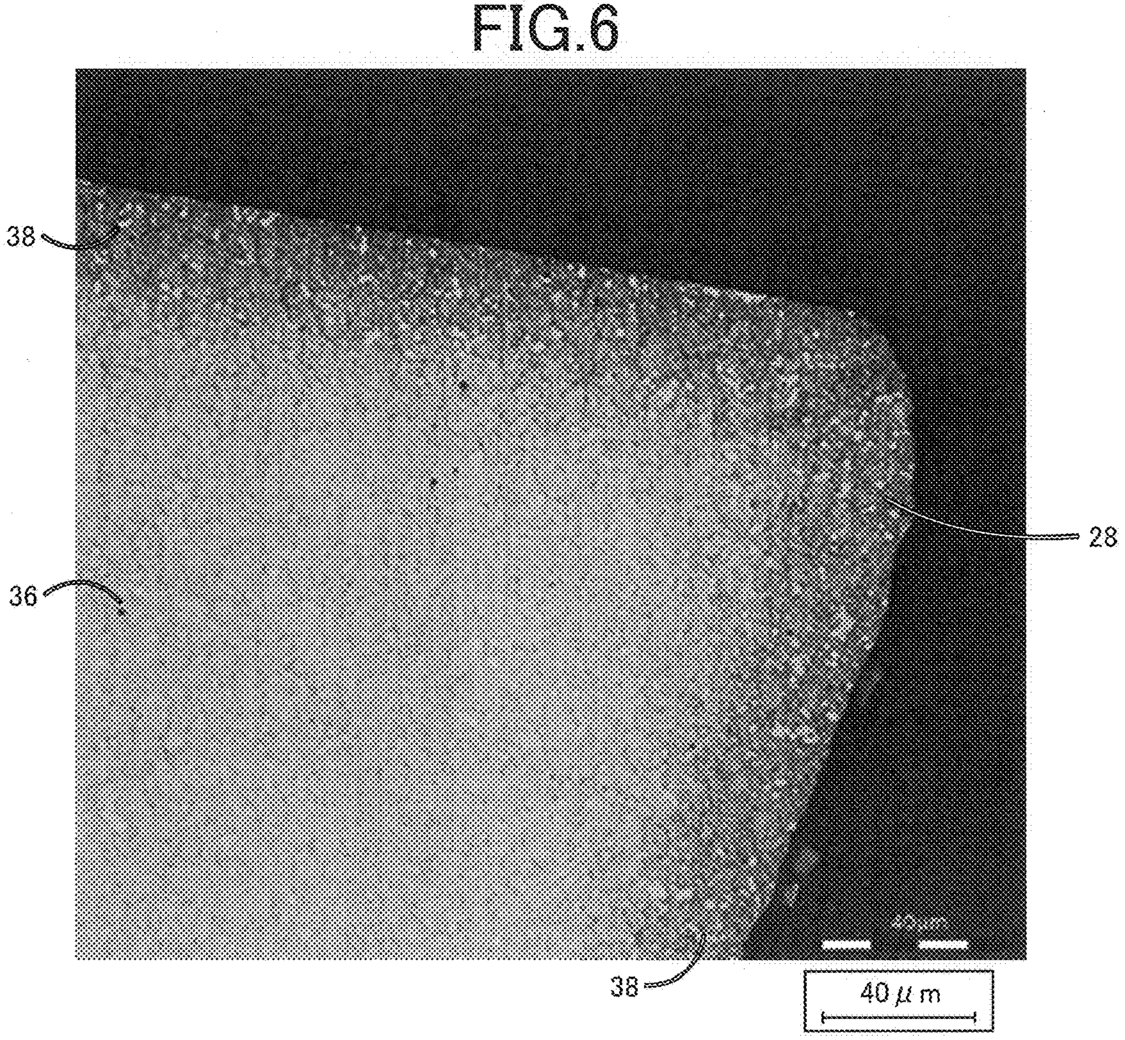
FIG. 6 is a metallurgical microscope photograph showing, in enlargement, the cutting edge portion of the spiral tap of FIG. 1 after the cutting edge portion has been subjected to the honing treatment.

FIG. 6 is a photograph showing, in enlargement, the cutting edge portion 28 after the nitriding treatment and after the honing treatment. It is noted that each of FIGS. 4 and 6 is a photograph of an enlarged image enlarged by a metallurgical microscope after corroding a cross section of the spiral tap 10 with an etchant. A nitrogen diffusion layer 38 is more susceptible to corrosion than a tool base material 36, and is shown relatively dark in the metallurgical microscope photograph in each of FIGS. 4 and 6.

The cutting edge portion 28 is round-chamfered, for example, by a honing (R honing) processing, so that a tip portion 34 is removed as shown in the enlarged cross-sectional view of FIG. 5 and the enlarged photograph of FIG. 6. The tip portion 34 is a sharp portion that is formed in the tool base material 36 at a forming step that is implemented by grinding, for example. A difference between a thickness t1 of the nitrogen diffusion layer 38 in the cutting edge portion 28 and a thickness t2 of the nitrogen diffusion layer 38 in other portions (such as the flank surface 32 and the rake surface 30) other than the cutting edge portion 28 is not larger than 5 μm (see FIGS. 5 and 6). The thickness t1 of the nitrogen diffusion layer 38 in the cutting edge portion 28 is a value measured in a direction of a half angle ($\alpha/2$) of the edge angle $\alpha$. The direction t2 of the nitrogen diffusion layer 38 in each of the flank surface 32 and the rake surface 30 is a value measured in a direction perpendicular to the each of the flank surface 32 and the rake surface 30.

Figure 7:
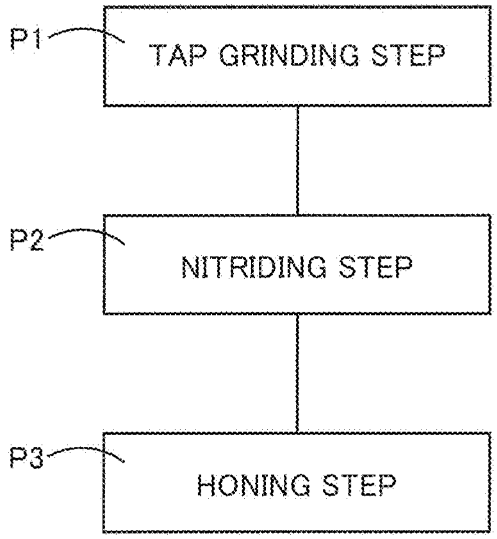
FIG. 7 is a process diagram showing a main part of a production process of the spiral tap of FIG. 1.

FIG. 7 is a process diagram showing a main part of a production process of the spiral tap 10. At a tap grinding step P1, the screw thread 18 is formed by a thread grinding that is made on the tool base material 36 having a cylindrical shape and made of high-speed tool steel, for example. Further, at the tap grinding step P1, the spiral flutes 20 are formed by a flute grinding, and the leading portion 22 is formed by grinding a crest portion. Still further, at the tap grinding step P1, the tool base material 36 is quenched as needed.

Then, at a nitriding step P2, by performing gas nitriding in an atmosphere furnace that maintains a temperature ranging from 500° C. to 550° C. under an ammonia gas atmosphere, the nitrogen diffusion layer 38 having a thickness ranging from about 10 μm to 30 μm, for example, is formed on a surface of the tool base material 36, as shown in the enlarged cross-sectional view shown in FIG. 3 and the enlarged photograph shown in FIG. 4. A surface hardness of the tool base material 36, on which the nitrogen diffusion layer 38 is formed, ranges from 950 HV to 1050 HV (JIS Z 2244:2009), for example. An indentation load of 0.3 Kgf was used in the measurement of this Vickers hardness HV.

Then, at a honing step P3, abrasive particles such as $Al_2O_3$ and SiC are ejected from a nozzle N together with compressed air locally toward the tip portion 34, i.e., a distal end of the nitrided cutting edge portion 28, such that the tip portion 34 is removed whereby the distal end of the cutting edge portion 28 is rounded. As a result, the difference between the thickness t1 of the nitrogen diffusion layer 38 in the cutting edge portion 28 and the thickness t2 of the nitrogen diffusion layer 38 in the rake and flank surfaces 30, 32 becomes not larger than 5 μm. Thus, a honing processing is performed. The enlarged cross-sectional view of FIG. 5 and the enlarged photograph of FIG. 6 show this state. It is preferable that the nozzle N is directed in the direction of the half angle ($\alpha/2$) of the edge angle $\alpha$ of the tip portion 34.

[Cutting Test 1]

The present inventors and their colleagues prepared samples 1-6, which had the same material and shape as the spiral tap 10 but were different in surface treatment and honing processing, as shown in Table 2. Then, they executed cutting operations (for machining internal threads) by using two of each of the samples under a cutting test condition shown in Table 1 given below, and then each tool (sample) was observed each time 100 internal threads have been machined, so as to know and evaluate the state of damage. Moreover, they determined whether the continuous use was difficult or not, depending on wear amount or presence or absence of chipping, and judged that the service life has been over when determining that continuous use has become difficult. They recorded the number of machining (number of machined threads) when judging that the service life has been over.

TABLE 1

| | |
|---|---|
| Work Material: | S45C |
| Thread size: | M10 × 1.5 mm (pitch) |
| Machine tool: | Vertical machining center BT50 |
| Cutting fluid: | Water-soluble cutting fluid (diluted 10 times) |
| Cutting velocity: | 15 m/min |
| Depth of prepared hole: | 20 mm (blind hole) |

TABLE 2

| | Honing as pre-processing | Surface nitriding | Honing as post-processing |
|---|---|---|---|
| Sample 1 | NO | NO | NO |
| Sample 2 | NO | YES | NO |
| Sample 3 | NO | NO | YES |
| Sample 4 | NO | YES | YES |
| Sample 5 | YES | YES | YES |
| Sample 6 | YES | YES | NO |

Figures 8, 9:
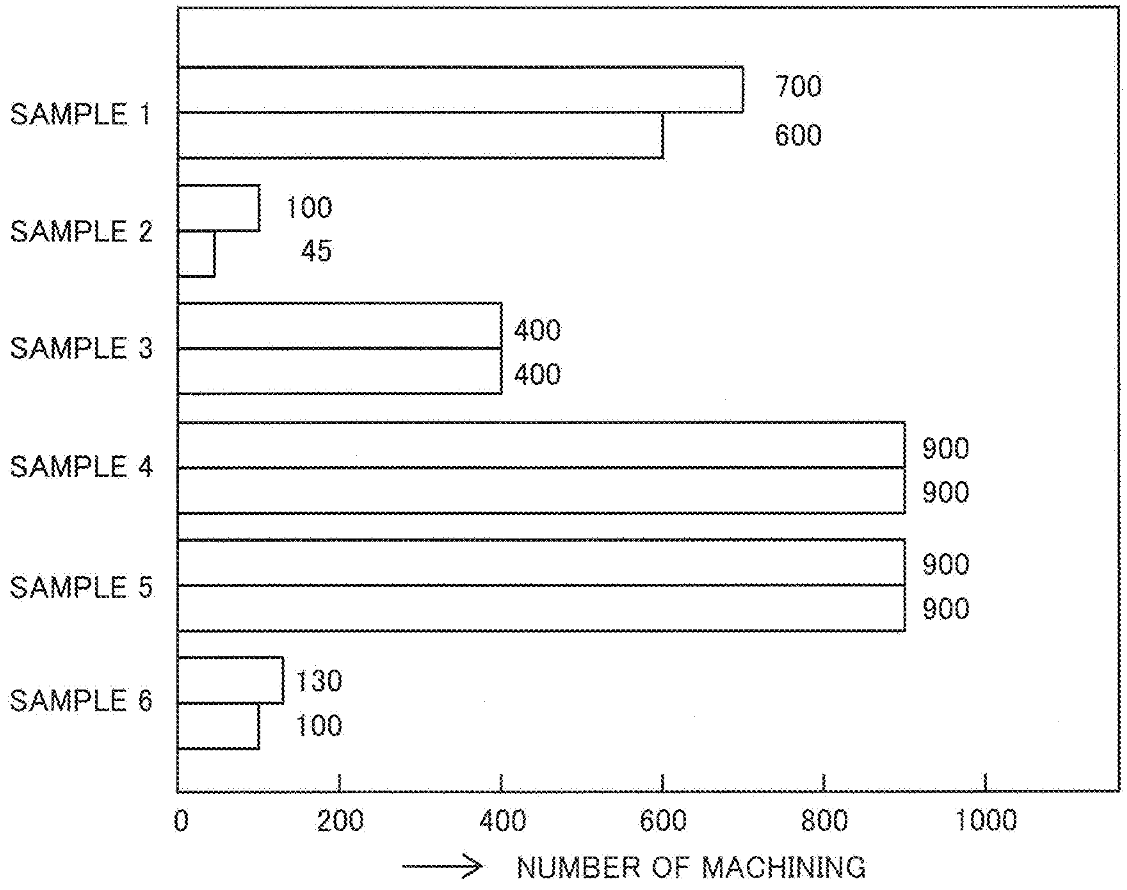
FIG. 8 is a chart showing results of cutting test 1 made by using various types of spiral taps.
FIG. 9 is a graph showing results of the cutting test of FIG. 8 in a manner that can compare among samples in terms of numbers of machined threads.
Figure 10:
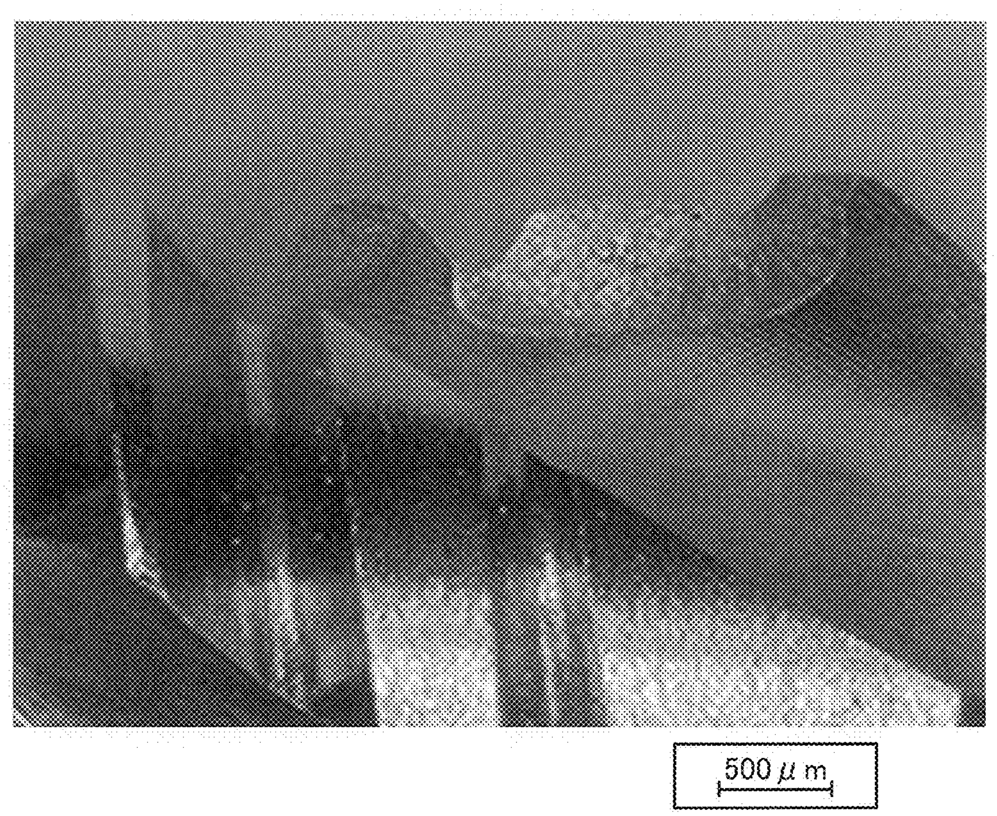
FIG. 10 is a metallurgical microscope photograph showing, in enlargement, the cutting edge portion of sample 2 shown in FIG. 8, as an example of occurrence of chipping.

FIG. 8 shows results of the cutting test 1. FIG. 9 is a graph representing numbers of machined threads, which are shown in FIG. 8, in a manner that can compare among the samples in terms of the number of machined threads. FIG. 10 is a metallurgical microscope photograph showing, in enlargement, the cutting edge portion 28 of the sample 2 shown in FIG. 8, as an example of occurrence of the chipping.

The sample 1 shown in FIGS. 8 and 9 is a spiral tap which has been conventionally used as a standard spiral tap, and which was not subjected to the honing processing and the nitriding treatment. In the sample 1, small edge breakage occurred in the tip portion 34 and then wear expanded from the small breakages. The service life (number of machined threads) was 700 in a first one of the sample 1, and the service life (number of machined threads) was 600 in a second one of the sample 1.

The sample 2 is a tap that was subjected to the nitriding treatment as in the nitriding step P2 so as to have a higher wear resistance than the sample 1. In the sample 2, chipping and breakage occurred in the tip portion 34 of the cutting edge portion 28 before the wear resistance was exhibited, so that the service life was considerably shorter than in the sample 1.

The sample 3 is a tap that was subjected to the honing processing as a countermeasure for preventing the edge breakage that occurred in the sample 1. In the sample 3, although occurrence of the edge breakage was suppressed, it looked as if an initial wear occurred from the brand new, due to the honing processing, so that wear was larger than in the sample 1, resulting in poor durability.

The sample 6 as well as the sample 5 is a tap that was subjected to the honing processing and the nitriding treatment. However, the tap of the sample 6 is different from the tap of the sample 5 in that the nitriding treatment was executed after the honing processing. In the sample 6, although the tip portion 34 of the cutting edge portion 28 was removed, the nitriding treatment was executed after removal of the tip portion 34, so that the thickness t1 of the nitrogen diffusion layer 38 in the cutting edge portion 28 is larger than the thickness t2 of the nitrogen diffusion layer 38 in the rake and flank surfaces 30, 32, and accordingly the nitrogen concentration and hardness are high in a surface of the cutting edge portion 28, whereby the cutting edge portion 28 is brittle. Thus, in the sample 6, the effect for suppressing the breakage is limited. Since the nitrogen concentration and hardness are changed exponentially from the surface, even a relatively small difference in the thickness of the nitrogen diffusion layer 38 is assumed to have a large effect.

On the other hand, in each of the samples 4 and 5 in which the nitriding treatment was executed before the honing processing, even after 900 threads have been machined, no damage and few wear were seen in the cutting edge portion 28 and accordingly it was determined that further continuation of the machining was possible, although the cutting test was finished after machining of 900 threads. This is because the tip portion 34 of the cutting edge portion 28, which has relatively high nitrogen concentration and hardness and is mechanically brittle, is removed by the honing processing after the nitriding treatment, so that the nitrogen diffusion layer 38 is substantially uniform. Therefore, it is assumed that the cutting edge portion 28 of the cut tap 10 has no substantial wear or chipping, and that good cutting performance can be maintained over a long period of time

[Cutting Test 2]

The present inventors and their colleagues prepared sample A, sample B, sample C, sample D and sample E, which had the same material and shape as the spiral tap 10 and were subjected to the nitriding treatment and the honing processing but which were different in the difference Δt (=|t1−t2|) between the thickness t1 of the nitrogen diffusion layer 38 in the surface of the cutting edge portion 28 and the thickness t2 of the surface of the nitrogen diffusion layer 38 on the surface of the tool base material 36 (in other portions other than the cutting edge portion 28), as shown in Table 3. Then, they executed cutting operations (for machining internal threads) by using two of each of the samples under a cutting test condition shown in Table 1 given above, and then each tool (sample) was observed each time 100 internal threads have been machined, so as to know and evaluate the state of damage. Moreover, they determined whether the continuous use was difficult or not, depending on wear amount or presence or absence of chipping, and judged that the service life has been over when determining that continuous use has become difficult. They recorded the number of machining (number of machined threads) when judging that the service life has been over. It is noted that “Thickness difference” in Table 3 represents t1−t2.

TABLE 3

| | Honing as pre-processing | Surface nitriding | Honing as post-processing | Thickness difference |
|---|---|---|---|---|
| Sample 1 | NO | NO | NO | NO |
| Sample 2 | NO | YES | NO | 13 μm |
| Sample A | NO | YES | YES | 9 μm |
| Sample B | NO | YES | YES | 5 μm |
| Sample C | NO | YES | YES | 1 μm |

TABLE 3-continued

| | Honing as pre-processing | Surface nitriding | Honing as post-processing | Thickness difference |
|---|---|---|---|---|
| Sample D | NO | YES | YES | −5 μm |
| Sample E | NO | YES | YES | −9 μm |

Figures 11, 12:
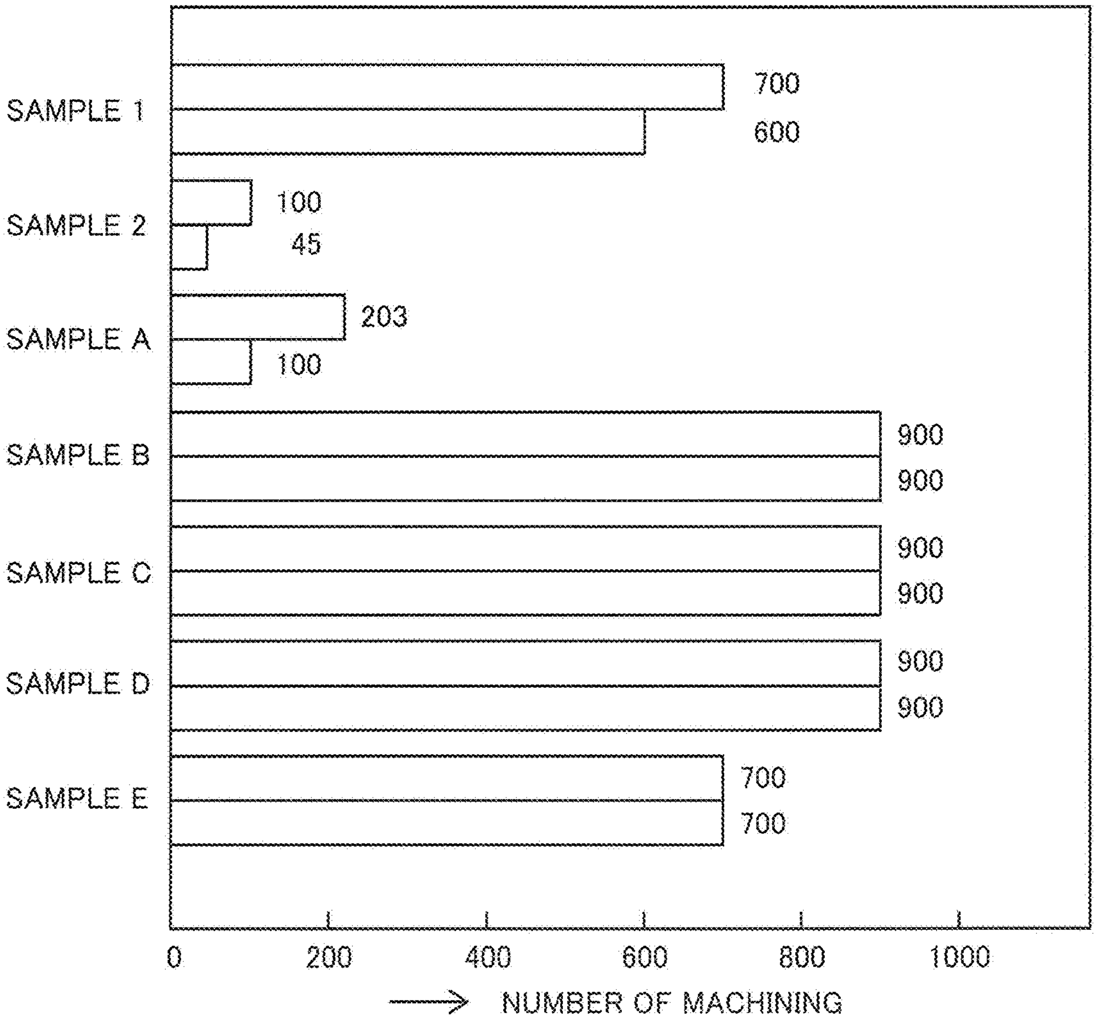
FIG. 11 is a chart showing results of cutting test 2 made by using various types of spiral taps.
FIG. 12 is a graph showing results of the cutting test of FIG. 11 in a manner that can compare among samples in terms of numbers of machined threads.

FIG. 11 shows results of the cutting test 2. FIG. 12 is a graph representing numbers of machined threads, which are shown in FIG. 11, in a manner that can compare among the samples in terms of the number of machined threads.

The sample 1 shown in FIGS. 11 and 12 is a tap which has been conventionally used as a standard spiral tap, and which was not subjected to the honing processing and the nitriding treatment. In the sample 1, small edge breakage occurred in the tip portion 34 and then wear expanded from the small breakages. The service life (number of machined threads) was 700 in a first one of the sample 1, and the service life (number of machined threads) was 600 in a second one of the sample 1.

The sample 2 is a tap that was subjected to the nitriding treatment as in the nitriding step P2 so as to have a higher wear resistance than the sample 1, such that the difference Δt between the thickness t1 and the thickness t2 is 13 μm. In the sample 2, chipping and breakage occurred in the tip portion 34 of the cutting edge portion 28 before the wear resistance was exhibited, so that the service life was considerably shorter than in the sample 1.

In the sample A, the honing processing was slightly applied as a post-processing to the sample 2, such that the difference Δt between the thickness t1 and the thickness t2 was 9 μm. In this sample A, since the honing processing as the post-processing was insufficient, the breakage and chipping occurred.

In each of the samples B and C, the honing processing (honing step P3) as the post-processing was appropriately applied to the sample 2, such that the difference Δt between the thickness t1 and the thickness t2 was 5 μm in the sample B and was 1 μm in the sample C. In each of samples B and C, even after 900 threads have been machined, no damage and few wear were seen in the cutting edge portion 28 and accordingly it was determined that further continuation of the machining was possible, although the cutting test was finished after machining of 900 threads.

In the sample D, the honing processing as the post-processing was a little excessively applied to the sample 2, such that the difference Δt between the thickness t1 and the thickness t2 was 5 μm (t1−t2=−5 μm). In the sample D, after 900 threads have been machined, no damage but large wear was seen in the cutting edge portion 28 and accordingly it was determined that further continuation of the machining was not possible. However, the wear resistance was better than in the sample 1. It is assumed that a good cutting performance was maintained over a long period of time without wear and chipping in the cutting edge portion 28 of the cut tap, because the tip portion 34 of the cutting edge portion 28, which is mechanically brittle due to the relatively high nitrogen concentration and hardness, was removed by the honing processing after the nitriding treatment such that the difference Δt (absolute value) between the thickness t1 and the thickness t2 was not larger than 5 μm whereby the nitrogen diffusion layer 38 was substantially uniform.

In the sample E, the honing processing as the post-processing was excessively applied to the sample 2, such that the difference Δt between the thickness t1 and the thickness t2 was 9 μm (t1−t2=−9 μm). In the sample E, the wear resistance was insufficient, and the wear has become excessive when the number of machining has exceeded 700.

As described above, in the method of producing the spiral tap (cup tap) 10 according to the present embodiment, the nitriding step P2 is implemented to form the nitrogen diffusion layer 38 in which the nitrogen atoms contained in the atmospheric gas are diffused from the surface of the tool base material 36 of the cut tap under heat, and then the honing step P3 is implemented to round the cutting edge portion 28 by colliding the abrasive particles against the cutting edge portion 28 of the tool base material 36 of the cut tap, whereby the tip portion 34 is removed. In the cutting edge portion 28, the nitrogen diffusion layer 38 is pre-formed to be thick due to the diffusion from the flank surface 32 and the diffusion from the rake surface 30, so that the tip portion 34 of the cutting edge portion 28 has relatively high nitrogen concentration and hardness so as to be mechanically brittle. Therefore, with removal of the tip portion 34 that is mechanically brittle, it is possible to reduce the wear and chipping of the cutting edge portion 28 of the cut tap and to obtain a tool performance for maintaining a good cutting performance over a long period of time. Further, a thickness of the nitrogen diffusion layer 38 can be made uniform.

Further, in the spiral tap (cut tap) 10, the difference Δt (absolute value) between the thickness t1 of the nitrogen diffusion layer 38 in the cutting edge portion 28 of the spiral tap 10 and the thickness t2 of the nitrogen diffusion layer 38 in another portion (such as the flank surface 32 and the rake surface 30) other than the cutting edge portion 28, is not larger than 5 μm. Therefore, the nitrogen concentration and the hardness are not so high in the cutting edge portion 28, and there is no large difference between the cutting edge portion 28 and the other portion in terms of the mechanical brittleness, so that the wear and chipping of the cutting edge portion 28 of the spiral tap 10 are reduced whereby the tool performance for maintaining a good cutting performance over a long period of time can be obtained.

While the embodiment of the present invention has been described by reference to the accompanying drawings, it is to be understood that the present invention is applicable also to other forms.

For example, in the above-described embodiment, the cut tap (spiral tap 10) is provided with the spiral flutes 20. However, the flutes may be straight flute or spiral point flutes, too. The cut tap of the present invention may be a straight flute tap, a spiral tap, a thread milling cutter or any other rotary cutting tool that includes a cutting edge or edges.

In the above-described embodiment, the cut tap (spiral tap 10) has three teeth. However, a number of teeth is not particularly limited. The cut tap of the present invention may be constituted by using any one of various tool materials (tool base material 36) such as high-speed tool steel and cemented carbide steel, and may be covered with a hard coating such as AlCrN that is disposed on the nitrogen diffusion layer 38, as needed.

In the above-described embodiment, the gas nitriding is made at the nitriding step P2. However, the gas nitriding may be replaced by other nitriding such as gas nitrocarburizing, ion nitriding, salt bath nitriding and plasma nitriding.

In the above-described embodiment, at the honing step P3, the tip portion 34 of the cutting edge portion 28, by locally blasting the cutting edge portion 28 with the abrasive particles. However, the cutting edge portion 28 may be blasted also by using other material such as glass beads and steel balls.

At the honing step P3, the abrasive particles may be applied with compressed air or liquid. Further, the honing step P3 may be performed also by barrel polishing with polishing pieces in a barrel tank. Although the barrel grinding is not grinding a local part, the sharp tip portion 34 is preferentially removed in the cut tap 10 by the barrel grinding. Abrasive particles may be abrasive grains such as $Al_2O_3$ and SiC, but glass particles and steel balls may also be used.

It is to be understood that what has been described above is merely an embodiment of the present invention, and that the present invention may be embodied with various changes and modifications based on knowledges of those skilled in the art.

DESCRIPTION OF REFERENCE SIGNS

10: spiral tap (cut tap)

28: cutting edge portion

30: rake surface (another portion other than the cutting edge portion)

32: flank surface (another portion other than the cutting edge portion)

36: tool base material (base material)

38: nitrogen diffusion layer

Δt: difference

The invention claimed is:

1. A method of producing a nitrided cut tap that includes a nitrogen diffusion layer, the method comprising:

a nitriding step for forming the nitrogen diffusion layer in which nitrogen atoms contained in an atmospheric gas are diffused from a surface of a base material of the cut tap under heat, such that the nitrogen diffusion layer has a thickness ranging from 10 μm to 30 μm; and a honing step for rounding a cutting edge portion by colliding abrasive particles against a local part of the cutting edge portion of the base material of the cut tap that has been subjected to the nitriding step, such that a difference between a thickness of the nitrogen diffusion layer in the cutting edge portion and a thickness of the nitrogen diffusion layer in flank and rake surfaces sandwiching the cutting edge portion, is not larger than 5 μm.

2. A nitrided cut tap comprising a nitrogen diffusion layer in flank and rake surfaces sandwiching a cutting edge portion, wherein the nitrided cut tap is a tap produced in accordance with the method according to claim 1, and wherein a difference between a thickness of the nitrogen diffusion layer in the cutting edge portion of the cut tap and a thickness of the nitrogen diffusion layer in another portion which is other than the cutting edge portion and which includes parts of the flank and rake surfaces, is not larger than 5 μm.

3. The method according to claim 1, wherein the thickness of the nitrogen diffusion layer in the cutting edge portion is a thickness measured in a direction of a half angle of an edge angle of the cutting edge portion, and the thickness of the nitrogen diffusion layer in the another portion is a thickness measured in a direction perpendicular to a surface of the another portion.

4. The method according to claim 1, wherein the honing step is implemented by using a nozzle that ejects the abrasive particles toward the cutting edge portion from a direction of a half angle of an edge angle of the cutting edge portion.

* * * * *